(12) United States Patent
 Paillet et al.

(10) Patent No.: US 11,310,716 B2
(45) Date of Patent: Apr. 19, 2022

(54) METHOD OF SELECTING A ROUTE IN AN AD HOC NETWORK

(71) Applicant: ORANGE, Issy-les-Moulineaux (FR)

(72) Inventors: Éric Paillet, Chatillon (FR); Lucas Trebouet Voisin, Chatillon (FR)

(73) Assignee: ORANGE, Issy-les-Moulineaux (FR)

( * ) Notice: Subject to any disclaimer, the term of this patent is extended or adjusted under 35 U.S.C. 154(b) by 0 days.

(21) Appl. No.: 15/734,753

(22) PCT Filed: Jun. 3, 2019

(86) PCT No.: PCT/FR2019/051292
 § 371 (c)(1),
 (2) Date: Dec. 3, 2020

(87) PCT Pub. No.: WO2019/234333
 PCT Pub. Date: Dec. 12, 2019

(65) Prior Publication Data
 US 2021/0243671 A1   Aug. 5, 2021

(30) Foreign Application Priority Data

Jun. 6, 2018 (FR) ...................................... 1854919

(51) Int. Cl.
 *H04W 40/14* (2009.01)
 *H04W 40/24* (2009.01)
 *H04W 84/18* (2009.01)
(52) U.S. Cl.
 CPC ......... *H04W 40/14* (2013.01); *H04W 40/246* (2013.01); *H04W 40/248* (2013.01); *H04W 84/18* (2013.01)

(58) Field of Classification Search
 CPC . H04W 40/14; H04W 40/246; H04W 40/248; H04W 84/18
 See application file for complete search history.

(56) References Cited

U.S. PATENT DOCUMENTS

2012/0134298 A1\* 5/2012 Liu ....................... H04W 40/28
 370/255
2016/0330080 A1\* 11/2016 Bhatia ..................... H04L 41/12

OTHER PUBLICATIONS

English translation of the Written Opinion of the International Searching Authority dated Sep. 18, 2019 for corresponding International Application No. PCT/FR2019/051292, filed Jun. 3, 2019.

(Continued)

*Primary Examiner* — Hashim S Bhatti
(74) *Attorney, Agent, or Firm* — David D. Brush; Westman, Champlin & Koehler, P.A.

(57) ABSTRACT

A method implemented by a first node of an ad hoc network, including maintaining a routing table containing at least one route available within the network having at least one segment directly linking two nodes of the network by a connectivity link having a type identified in the table, and for each node of a segment, an indication concerning its degree of mobility. The table is maintained based on information extracted from control messages emitted over the network and intended for or traveling through the first node. The method includes: upon sending a data message from the first node to a second node: identifying, by using the table, at least one route between the first and second nodes; and determining a level of stability of each route based on the degree of mobility of the nodes and on the type of connectivity links; and selecting the most stable route.

20 Claims, 3 Drawing Sheets

(56) References Cited

OTHER PUBLICATIONS

International Search Report dated Sep. 11, 2019 for corresponding International Application No. PCT/FR2019/051292, dated Jun. 3, 2019.
Written Opinion of the International Searching Authority dated Sep. 11, 2019 for corresponding International Application No. PCT/FR2019/051292, filed Jun. 3, 2019.
French Search Report dated Jan. 16, 2019 for corresponding French Application No. 1854919, filed Jun. 6, 2018.
Xianfeng Li et al. "LEPR: Link Stability Estimation-based Preemptive Routing protocol for flying Ad Hoc Networks" 2017 IEEE Symposium on Computers and Communications (ISCC), IEEE, Jul. 3, 2017 (Jul. 3, 2017), pp. 1079-1084, DOI: 10.1109/ISCC.2017.8024669, XP033148187.
Amri H A et al. "Scalability of MANET routing protocols for heterogeneous and homogenous networks" Computers & Electrical Engineering, Pergamon Press, GB, vol. 36, No. 4, Jul. 1, 2010 (Jul. 1, 2010), pp. 752-765, [retreived on Jan. 3, 2009], DOI: 10.1016/J.COMPELECENG.2008.11.008, ISSN: 0045-7906, XP027065128.

* cited by examiner

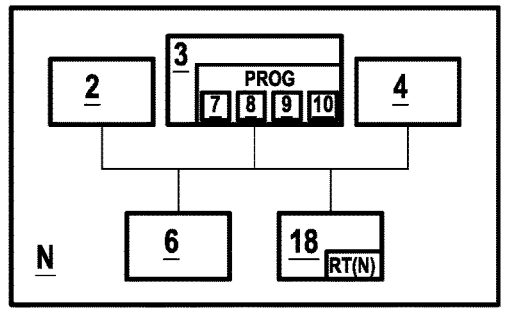

| ID | TYPE | CLUSTERS | ROUTE |
|---|---|---|---|
| A1 | box | A | (Wifi, A1) |
| A3 | PC | A | (Wifi, A1), (Wifi, A3) |
| A4 | mobile | A | (Wifi, A1), (Wifi, A4) |
| A4 | mobile | A | (Wifi, A1), (Wifi, A5), (Wifi, A4) |
| A5 | mobile | A | (Wifi, A1), (Wifi, A5) |
| A5 | mobile | A | (Wifi, A1), (Wifi, A4), (Wifi, A5) |
| A6 | mobile | A | (Wifi, A1), (Wifi, A5), (Wifi, A6) |
| A6 | mobile | A | (Wifi, A1), (Wifi, A4), (Wifi, A5), (Wifi, A6) |
| B1 | mobile | B | (WFD, B1) |
| B3D3 | mobile | B,D | (WFD, B1), (WFD, B3D3) |
| B4C4 | mobile | B,C | (WFD, B1), (WFD, B4C4) |
| B5 | mobile | B | (WFD, B1), (WFD, B5) |
| D1 | PC | D | (WFD, B1), (WFD, B3D3), (BLE, D1) |
| D1 | PC | D | (WFD, B1), (WFD, B4C4), (LTE, C1D4), (BLE, D2), (BLE, D1) |
| D2 | mobile | D | (WFD, B1), (WFD, B3D3), (BLE, D1), (BLE, D2) |
| D2 | mobile | D | (WFD, B1), (WFD, B4C4), (LTE, C1D4), (BLE, D2) |
| C1D4 | Antenna | C,D | (WFD, B1), (WFD, B3D3), (BLE, D1), (BLE, D2), (BLE, C1D4) |
| C1D4 | Antenna | C,D | (WFD, B1), (WFD, B4C4), (LTE, C1D4) |

WFD : Wifi Direct
LTE : LTE Direct
BLE : Bluetooth Low Energy

FIG.3

METHOD OF SELECTING A ROUTE IN AN AD HOC NETWORK

CROSS-REFERENCE TO RELATED APPLICATIONS

The present application is a Section 371 National Stage Application of International Application No. PCT/FR2019/051292, filed Jun. 3, 2019 and published as WO 2019/234333 A1 on Dec. 12, 2019, not in English, the contents of which are hereby incorporated by reference in their entireties.

BACKGROUND OF THE INVENTION

The invention relates to the general field of communications between several devices or terminals, such as, for example, computers, mobile phones, digital tablets, etc.

It concerns more particularly the Peer-to-Peer communications (or P2P) between several devices or terminals, more generally referred to as "nodes" hereafter. It is meant by Peer-to-Peer communication between two nodes, the exchange of data between these two nodes without typically passing through a central server. No limitation is attached to the type of data exchanged between the nodes (voice, text, etc.) during a Peer-to-Peer communication. This communication can consist of a direct exchange of data between the two nodes (this is then referred to as D2D or "Device-to-Device" communication), or an exchange via one or more intermediate nodes implementing D2D communications two by two, these intermediate nodes forming a route between the two nodes seeking to communicate together. The set of the nodes thus connected Peer-to-Peer form a mesh network without a central hierarchy, also called ad hoc network. When nodes of the ad hoc network are mobile, this is referred to as MANET network for Mobile Adhoc NETwork.

The nodes within the same ad hoc network can use different connectivity technologies to detect the presence of neighbor nodes, identify the applications or the services made available by these neighbor nodes, and connect with each other in order to communicate Peer-to-Peer. They can in particular rely indifferently on Bluetooth, WiFi (Wireless Fidelity), WiFi Direct, LTE (Long Term Evolution) Direct technologies, etc. They can also be connected to elements external to the ad hoc network, such as, for example, to other devices belonging to operator networks (e.g. 3G, 4G, 5G networks, etc.) or to private networks, etc., for example to access the public Internet network.

If the ad hoc networks and more particularly the MANET networks have the property of self-organizing quickly, they are also particularly unstable: the nodes that compose them are indeed for some mobiles, and therefore likely to disappear or appear suddenly in the network as they move. The routing of the messages between two nodes of an ad hoc network can therefore prove to be a complex task.

Several routing protocols proposed by the MANET standardization group have been normalized within the IETF (Internet Engineering Task Force). These routing protocols can be classified into three main categories.

A first category groups together the routing protocols called proactive routing protocols. These protocols ensure that each node in the ad hoc network maintains up-to-date its knowledge of the topology of the network in order to be able to quickly determine the routes available within the network to exchange data with other nodes. To this end, proactive routing protocols provide the periodic broadcast over the entire ad hoc network, by each node of the network, of control messages (messages "Hello"), in parallel with data transmission messages, declaring the state of the links that each node maintains with its neighbor nodes. The broadcasting of these control messages allows each node of the ad hoc network to discover all the valid (i.e. available) routes towards all the nodes of the network, and therefore to maintain up-to-date a routing table identifying these routes and taking into account the topology changes likely to affect the network.

Examples of proactive routing protocols are DSDV (Dynamic destination Sequences Distance Vector), GSR (Global State Routing) or OLSR (Optimized Link State Routing Protocol) protocols. These protocols have the advantage of allowing efficient routing of the data messages within small-dimensioned ad hoc networks, due to the routing tables maintained up-to-date by each node of the network. However, due to the numerous (for some, to the unnecessary) control messages that are periodically broadcast over the network and to the fact that all possible routes are maintained over the network even if these are not used, their effectiveness decreases as the size of the ad hoc network increases.

A second category of protocols comprises the protocols called reactive routing protocols. As opposed to the proactive routing protocols, the reactive routing protocols determine and maintain up-to-date the available routes within the ad hoc network depending on the needs of nodes wishing to transmit data over the network. Control messages aiming at discovering the routes available on the network (messages "Route Request") are sent by a node only when the latter needs to identify a route to emit data to another node, and when it does not have such a route already stored in its routing table. The routing tables maintained by the nodes of the network are therefore filled only at their demand. Each node of the network has only partial knowledge of the topology of the network being limited to the nodes with which it has already communicated.

Examples of reactive routing protocols are the DSR (Dynamic Source Routing) and AODV (Ad Hoc On-Demand Distance Vector) protocols. The major advantage of these reactive routing protocols is that they do not result in excessive flooding of the network with inadvertently broadcast control messages. They are therefore particularly well adapted for dense networks. On the other hand, the time taken by a node to determine a route may be long, including when the destination node of the message is in its vicinity.

A third category of protocols mixes the proactive and reactive approaches: these are protocols called hybrid routing protocols. These protocols rely on the proactive approach to determine the routes in the vicinity of the nodes (i.e. located at a few hops from the nodes, for example two or three hops). Beyond this neighborhood, they use the reactive approach for searching the routes (i.e. searching on demand, only in case of specific need of the nodes). An example of a hybrid routing protocol is the ZRP (Zone Routing Protocol) protocol.

The hybrid routing protocols are the protocols that are favored within the framework of the networks comprising mobile nodes: they allow avoiding excessive flooding of the networks with control messages and adapt to the variable and potentially large size of the ad hoc networks. However, if they allow optimizing the routing of the short-distance data, the time taken by a node to discover a route allowing to join another node that is not in its vicinity, may be long (as with the reactive routing protocols).

There is therefore a need to improve the routing mechanisms proposed in the state of the art, particularly within the framework of the networks involving mobile nodes.

OBJECT AND SUMMARY OF THE INVENTION

The invention meets in particular this need by proposing a method for selecting a route in an ad hoc network intended to be implemented by a node of this network, called "first node", this selection method comprising:

a step of maintaining up-to-date a routing table containing at least one route available within the ad hoc network, each route comprising at least one route segment directly linking together two nodes of the ad hoc network by a connectivity link, one type of which is identified in the routing table, said routing table further comprising, for each node different from the first node belonging to a said route segment, an indication concerning a degree of mobility of this node, the routing table being maintained up-to-date based on information extracted from control messages emitted over the ad hoc network intended for the first node and from control messages emitted over the network traveling through the first node;

upon sending of a data message from the first node to a second node of the ad hoc network:

a step of identifying, by using the routing table, at least one route available between the first node and the second node to send the data message; and if several available routes are identified:

a step of determining, for each identified available route, a level of stability based on the indications concerning the degree of mobility of the nodes of the route and on the type of connectivity links of the route segments contained in the routing table; and a step of selecting the identified available route corresponding to the determined best level of stability.

Correlatively, the invention also relates to a node of an ad hoc network, called "first node", comprising:

a module for maintaining up-to-date a routing table containing at least one route available within the ad hoc network, each route comprising at least one route segment directly linking together two nodes of the ad hoc network by a connectivity link, one type of which is identified in the routing table, said routing table further comprising, for each node different from the first node belonging to a said route segment, an indication concerning a degree of mobility of this node, the routing table being maintained up-to-date based on information extracted from control messages emitted over the ad hoc network intended for the first node and from control messages emitted over the network traveling through the first node;

modules activated upon sending of a data message from the first node to a second node of the ad hoc network, and comprising:

an identification module, configured to identify at least one available route between the first node and the second node by using the routing table maintained up-to-date by the up-to-date maintenance module;

modules activated if several routes available between the first node and the second node are identified by the identification module, these modules comprising a determination module, configured to determine for each identified available route, a level of stability based on the indications concerning the degree of mobility of the nodes of the route and on the type of connectivity links of the route segments contained in the routing table, and a selection module configured to select the identified available route corresponding to the determined best level of stability.

No limitation is attached to the nature of the nodes to which the invention applies. Indeed, the invention applies to any type of device likely to communicate Peer-to-Peer with another device, and provided with a connectivity interface allowing it to establish a connectivity link with this other device. This connectivity interface can be of different types: it can be a wired interface such as an Ethernet interface, xDSL (Digital Subscriber Line), optical fiber, etc., or a wireless interface such as WiFI, Bluetooth, 2G, 3G, 4G, LTE, etc.

In addition, the invention advantageously applies to ad hoc networks which may include fixed nodes as well as mobile nodes. In order to improve the routing within such networks, the invention proposes, when several routes towards a node (second node within the meaning of the invention) are available within the ad hoc network (that is to say are active within the network), to select the route that seems the most stable in terms of connectivity. This route stability is assessed taking into account, preferably:

on the one hand, the supposed stability of the connectivity links linking together the nodes of the route. This supposed stability of the connectivity links depends on the type of these links and in particular on the nature of the connectivity interfaces used on these links (such as for example if it is a WiFI, Bluetooth, Ethernet, etc. link); and on the other hand, the stability of the nodes strictly speaking traversed by the route. The stability of the nodes is estimated based on their degree of mobility (for example "fixed" or "mobile"). Indeed, the more a node is mobile, the more its durability within the network may be limited (it presents a probability of suddenly appearing and disappearing obviously greater than that of a fixed node), and therefore the more its stability is threatened.

By choosing the most stable route as proposed by the invention for routing the data messages exchanged within the ad hoc network, the durability of the routes taken is promoted, which allows reducing the risk of having routes that suddenly become unavailable and interrupted or delayed exchanges. The quality of the exchanges within the ad hoc network and the user experience resulting therefrom are thus improved thanks to the invention.

In order to allow selection of the most stable route within the network, the invention relies on maintaining up-to-date the routing tables hosted by the nodes of the network exploiting the routing information contained in all the control messages broadcast on the network and which travel through these nodes. Such control messages are typically control messages conventionally broadcast within the framework of a proactive routing protocol and/or control messages conventionally broadcast within the framework of a reactive routing protocol, and in particular comprise announcement messages, route discovery messages, response messages to the discovery messages as well as error messages reporting an unavailability of a node or link of the ad hoc network detected by another node. Thus, unlike the state of the art, in order to maintain up-to-date the routing table of a node of the ad hoc network, account is not only taken of the announcement messages intended for this node and emitted by its neighbors or the messages sent in response to the route discovery messages emitted by the node, but account is taken of all the control messages traveling through (i.e. relayed) by this node and that are not directly intended for it. By continuously exploiting these control messages intended for or traveling through the node, the relevance and validity of the information contained in its routing table are improved. This allows each node of the network to identify more quickly the changes in the network configuration topology, both at the nodes that compose it and at the connectivity links existing between these nodes.

In one particular embodiment, the selection method further comprises:
- a step of assigning a stability score called local stability score to each type of connectivity link and to each type of degree of mobility likely to be contained in the routing table; and
- a step of calculating a stability score called overall stability score for each identified available route reflecting the level of stability of this route, this overall stability score being calculated from a weighted sum of the local stability scores assigned to the connectivity links of the segments of this route based on their type and to the nodes of this route based on the indications concerning their degree of mobility, contained in the table.

This embodiment provides a simple and efficient way to assess the stability of a route. It allows easy differentiation, via the assigned local stability scores, of the different connectivity links of the segments of each route as well as the degrees of mobility of the nodes of this route.

For example, during the assignment step:
- the local stability score assigned to a wired-type connectivity link is better than the local stability score assigned to a wireless-type connectivity link; and/or
- the local stability score assigned to a fixed-type degree of mobility is better than the local stability score assigned to a mobile-type degree of mobility.

This allows favoring the connectivity links and the nodes that have a better stability by nature, namely the wired-type connectivity and the fixed nodes.

It is further possible to assign, for the same type of connectivity link (for example, a wireless-type connectivity link), different local stability scores depending on the connectivity interface used (for example WiFI, Bluetooth, WiFi-Direct, etc.). Thus, for example, it is possible to assign a higher local stability score to a WiFi link than to a Bluetooth link (of lower range), or compared to a WiFI-Direct link (more unstable by experience than a WiFi link).

In one alternative embodiment, the local stability score assigned to a type of connectivity link may depend on a connectivity interface used on this link and on a theoretical throughput achievable on this type of link.

This allows adding supplementary granularity to the local stability scores assigned based on the type of connectivity link used. For example, for the same type of connectivity link (e.g. for a WiFI-type interface), it is possible to assign a local stability score that differs according to the theoretical throughput achievable on this type of link, and in particular assign a better local stability score to a link on which the theoretical throughput is stronger.

Similarly, it is possible to adjust the granularity of the local stability scores assigned based on the degree of mobility of the nodes so as to take into account the nature of these nodes (i.e. is it a box, a base station associated with a relay antenna of a mobile telecommunications network, a smartphone, a digital tablet, etc.).

In this way, it is possible to have a more reliable estimation of the stability of a route by taking into account the characteristics of the connectivity links of its segments and nodes.

In one particular embodiment, during the selection step, the route is selected while also taking into account:
- a type of data transported by the message; and/or
- a constraint in terms of propagation time, latency and/or throughput between the first node and the second node; and/or
- an absence or presence of at least one type of connectivity link for the route segments.

This embodiment allows choosing not only the route that seems to be the most stable (and therefore the most durable) in the network, but also the route whose technical characteristics best meet the functional requirements (for example constraints in terms of propagation time, throughput, etc.) of the application hosted by the node and that wishes to exchange data over the network (for example, videoconferencing application in real time) and thus further improve the user experience. In addition, this allows optimizing the use of the routes within the ad hoc network and regulating the traffic on these routes.

In one particular embodiment, during the up-to-date maintenance step, the routing table is also maintained up-to-date based on routing information extracted from data messages emitted over the ad hoc network intended for the first node and/or from data messages emitted over the network traveling through the first node.

This allows, on the one hand, improving the relevance of the information contained in the routing table and, on the other hand, facilitating the implementation of the embodiment mentioned above in which the selection of the route is carried out by also taking into account the functional requirements of the applications hosted by the nodes of the network and that wish to exchange data on this network. Indeed, the data messages conveyed on the network may contain information on the characteristics of the nodes and of the route segments taken by these messages (e.g. propagation time on these segments, latencies, lifetimes, etc.) that allow having a more accurate knowledge thereof and allow a more relevant selection of a stable route suitable for transmitting data.

It is noted that the invention applies regardless of the routing protocol implemented within the network. However, it has a privileged application when this routing protocol is a hybrid routing protocol, which is particularly well adapted when all or part of the nodes of the ad hoc network are mobile nodes.

For example, in one particular embodiment:
- the ad hoc network is organized in clusters;
- the routing table also comprises, for each node different from the first node belonging to a said route segment, an identifier of at least one cluster of the ad hoc network to which this node belongs;
- the first node uses a reactive routing protocol to emit route discovery messages to nodes that do not belong to a cluster to which it belongs.

In this particular embodiment, the first node can also use a proactive routing protocol to update its routing table with routes allowing it to join the nodes of the cluster to which it belongs.

In one particular embodiment, the different steps of the selection method are determined by computer program instructions.

Consequently, the invention also relates to a computer program on an information medium, this program being likely to be implemented in a node of the network or more generally in a computer, this program including instructions adapted to the implementation of the steps of a selection method as described above.

This program can use any programming language, and be in the form of source code, object code or intermediate code between source code and object code, such as in a partially compiled form, or in any other desirable form.

The invention also relates to information or recording medium readable by a computer and including instructions of a computer program as mentioned above.

The information or recording medium can be any entity or device capable of storing the program. For example, the medium may include a storage means, such as a ROM, for example a CD ROM or a microelectronic circuit ROM or a magnetic recording means, for example a hard disk.

On the other hand, the information or recording medium can be a transmissible medium such as an electrical or optical signal, which can be conveyed via an electrical or optical cable, by radio or by other means. The program according to the invention can be particularly downloaded over an Internet-type network.

Alternatively, the information or recording medium can be an integrated circuit in which the program is incorporated, the circuit being adapted to execute or to be used in the execution of the method in question.

The invention also relates to an ad hoc communication network comprising a plurality of nodes in accordance with the invention.

The ad hoc communication network according to the invention has the same advantages mentioned above as the selection method and the node in accordance with the invention.

Furthermore, in one particular embodiment, the nodes are organized into a plurality of clusters, these nodes being configured to implement a proactive routing protocol within the clusters to which they respectively belong and a reactive routing protocol outside these clusters, each cluster comprising a node called master node designated for the cluster able to emit control messages according to the reactive routing protocol to the master nodes of the other clusters, the master node designated for a cluster corresponding to the node among the nodes of the cluster which is the most stable in terms of connectivity and/or activity within the ad hoc network.

Such designation of the master nodes for the clusters allows further increasing the durability of the routes selected by the nodes.

It can also be envisaged, in other embodiments, that the selection method, the node of the ad hoc network and the ad hoc communication network according to the invention have in combination all or part of the aforementioned characteristics.

BRIEF DESCRIPTION OF THE DRAWINGS

Other characteristics and advantages of the present invention will emerge from the description given below, with reference to the appended drawings which illustrate an exemplary embodiment thereof without any limitation. In the figures:

FIG. 2 represents the hardware architecture of a node in accordance with the invention belonging to the ad hoc communication network of FIG. 1, in one particular embodiment;

FIG. 3 illustrates an example of a routing table maintained by a node of the ad hoc communication network of FIG. 1.

DETAILED DESCRIPTION OF THE INVENTION

Figure 1:
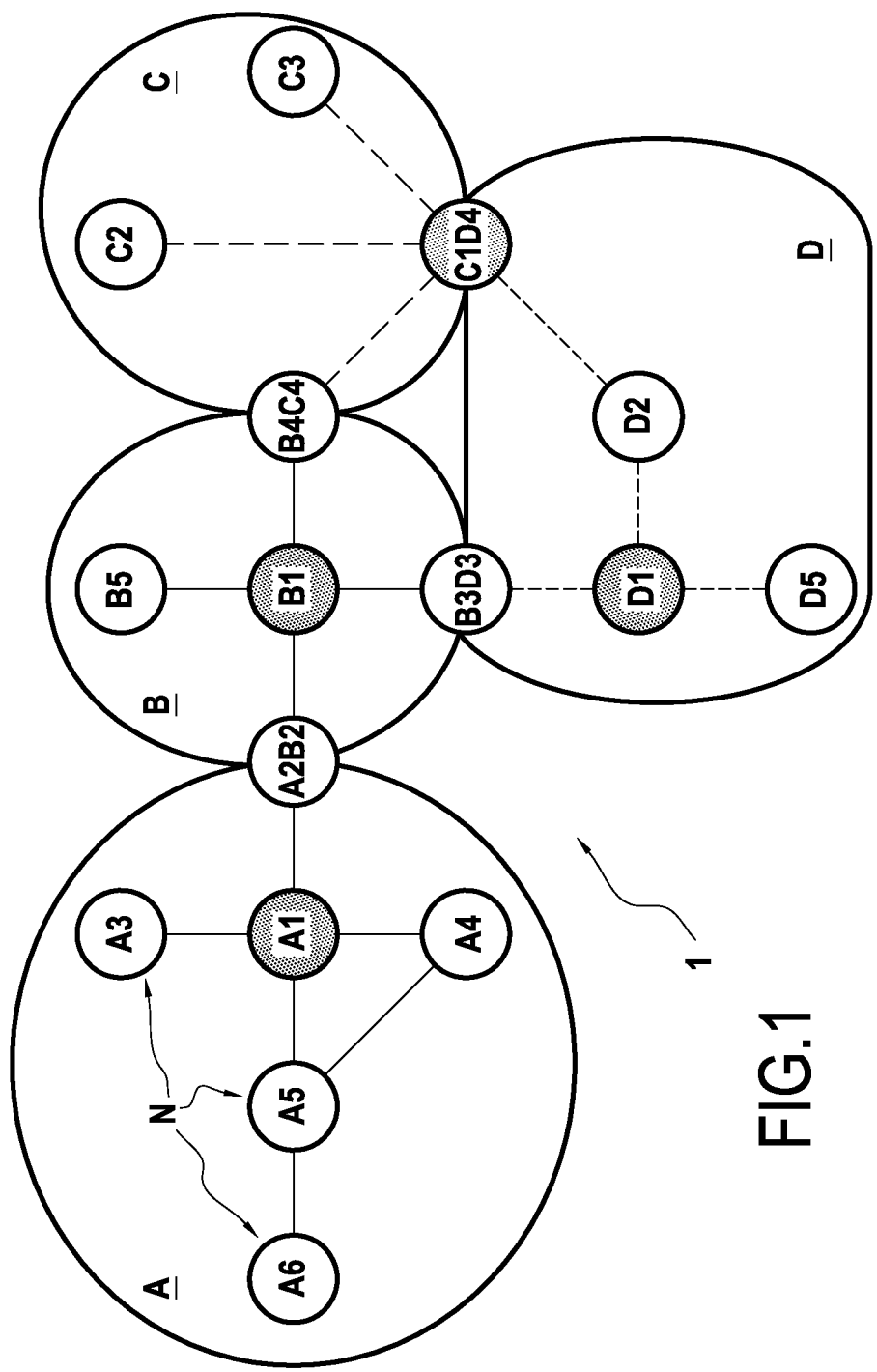
FIG. 1 represents, schematically, an ad hoc communication network in accordance with the invention, in a particular embodiment.

FIG. 1 represents, in its environment, an ad hoc communication network 1 in accordance with the invention, in one particular embodiment.

The ad hoc network 1 includes a plurality of nodes (generally referenced by N), in accordance with the invention (represented by circles in FIG. 1). No limitation is attached to the nature of these nodes strictly speaking: they can be any communication devices able to communicate with other devices such as for example terminals such as digital tablets, smartphones, laptop or desktop computers or residential gateways also more commonly called "box", servers, etc. Obviously, the example represented in FIG. 1 is given for illustrative purposes only and a different number of nodes can be envisaged.

In accordance with the invention, the nodes of the ad hoc network 1 are distinguished based on their degree of mobility: they may be mobile nodes, which are caused to move over time, such as for example a mobile phone, a digital tablet, etc., or fixed nodes which, on the contrary, are not intended to be in motion once installed (or only exceptionally), such as for example a point of access to a communication network such as a WiFi access point or a base station of a mobile communication network, a residential gateway or a stationary server. It is noted that the fixed or mobile nature of a node can depend on its nature (portable phone, fixed computer, box, etc.), but also on its context of use; thereby, there is here an interest in the supposed or declared degree of mobility of this node (see previous examples) or in the observed degree of mobility of this node. For example, if the node is not moved for a period of time greater than a predetermined threshold, this node can be considered within the meaning of the invention as being fixed. This can be the case, for example, of a laptop computer fixed on a docking station and used as a desktop computer.

The nodes of the ad hoc network 1 can communicate together via different technologies allowing to ensure their connectivity, such as for example a wireless technology such as WiFi, WiFi Direct, Bluetooth, Bluetooth Low Energy, a cellular technology such as 3G, 4G, 5G, etc. or a wired technology such as Ethernet, ADSL, etc. No limitation is attached to the implemented technologies on which the connectivity links, established between the nodes within the ad hoc network 1, rely. Each node can use one or more of these access technologies to communicate with its neighbor nodes; for example the same node can have with a neighbor node several links each using different technologies. In the remainder of the description, "neighbor nodes" of a node designates the nodes with which it has an active connectivity link. It should be noted that the notion of neighborhood is not necessarily linked to a geographical proximity depending on the technology used on the connectivity link, but is linked to the scope of this technology.

In the embodiment described here, each node N of the ad hoc network 1 has the hardware architecture of a computer, as represented in FIG. 2. It comprises in particular a processor 2, a read-only memory 3, a random-access memory 4, a non-volatile memory 5 and communication means 6. These communication means 6 allow the node N to communicate with the other nodes of the ad hoc network 1, via at least one connectivity interface using one of the technologies mentioned above (WiFI, WiFI Direct, Bluetooth, Bluetooth Low Energy, 3G, 4G, 5G, Ethernet, ADSL, optical fiber, etc.).

The read-only memory 3 of the node N constitutes a recording medium in accordance with the invention, readable by the processor 2 and on which a computer program PROG in accordance with the invention is recorded, including instructions for the execution of a method for selecting a route according to the invention. The program PROG defines in an equivalent manner various functional and software modules of the node N (namely here, an up-to-date maintenance module 7, an identification module 8, a determination module 9 and a selection module 10), able to implement the steps of the method for selecting a route according to the invention, and relying on the hardware elements 2-6 of the node N described above. This selection method is used by each node N to select a route within the ad hoc network 1 to route the data messages it wishes to send to the other nodes of the ad hoc network 1, as further described later with reference to FIG. 4.

In the example envisaged in FIG. 1, the nodes of the ad hoc network 1 are grouped into subsets also called "clusters". More particularly, in FIG. 1, the ad hoc network 1 comprises four clusters A, B, C, D. Each cluster aggregates nodes located in a given geometric perimeter and sharing common characteristics: in the example of FIG. 1, the nodes belonging to the same cluster are linked together by the same type of connectivity link. For example:
- the nodes A1, A2B2, A3, A4, A5 and A6 belonging to the cluster A are linked, where appropriate, by a connectivity link using the WiFI technology;
- the nodes B1, A2B2, B3, B4C4 and B5 belonging to the cluster B are linked, where appropriate, by a connectivity link using the WiFI Direct technology;
- the nodes C1D4, C2, C3 and B4C4 belonging to the cluster C are linked, where appropriate, by a connectivity link using a mobile radio technology such as for example a 3G, 4G or 5G technology; and
- the nodes D1, D2, B3D3, C1D4 and D5 belonging to the cluster D are linked, where appropriate, by a connectivity link using the Bluetooth Low Energy technology.

Of course, this example is only given as an illustration and it can be considered that a different number of clusters, a different number of nodes per cluster, different connectivity interfaces within each cluster, as well as different criteria for grouping the nodes within the same cluster (for example the nodes grouped together within the same cluster can share the same Peer-to-Peer application, belong to the same geographical area, etc.).

It is further noted that the same node can belong to different clusters. This is the case for example in FIG. 1 of the nodes A2B2 (which belongs to the cluster A and the cluster B), B4C4 (which belongs to the cluster B and the cluster C), C1D4 (which belongs to the cluster C and the cluster D) and B3D3 (which belongs to the cluster B and the cluster D).

In each cluster A, B, C, D, a node is designated as master node (also called "cluster-head") (represented by a hatched circle in FIG. 1): A1 for the cluster A, B1 for the cluster B, C1D4 for the cluster C and D1 for the cluster D. In the embodiment described here, the master nodes are designated within each cluster by taking into account the (declared, assumed or observed) stability of the different nodes of the cluster. More particularly, "master node" of a cluster designates the node that has the best stability in terms of connectivity (in particular due to its degree of mobility ("fixed" or "mobile") or to the type of connectivity links it maintains with the other nodes of the ad hoc network) and/or of its activity within the ad hoc network (are messages sent on the ad hoc network via this node, etc.). This stability can be assessed from various criteria, such as for example:
- a node can declare by itself to the other nodes of the cluster that it is fixed (and therefore a priori more stable than a mobile node);
- a node can be considered as stable because it is linked to other nodes of the ad hoc network 1 by a wired connectivity link (using for example ADSL technology or optical fiber);
- a node can be considered as stable because it belongs to a route whose durability (i.e. its age or its lifetime) is proven, that is to say it continues, and is active for a period of time greater than a predetermined threshold,
- a node can be considered as stable by definition due to its nature or its functions, for example it is a WiFI access point or it is attached to an antenna of a mobile operator network or again it is the group owner of a WiFI Direct group for example, etc.

A weighted combination of all or part of these criteria (and/or other criteria reflecting the stability or the absence of stability of a node) can be considered to designate the master node of each cluster: this weighted combination is then assessed for each node of the cluster considered, then the node which corresponds to the combination reflecting the greatest stability is retained as master node of the cluster. The list of the criteria to be assessed and the weighting mechanism are not described in more detail here.

In one alternative embodiment, or if it proves impossible to determine the most stable node of the cluster in view of the criteria considered, the master node of a cluster can be chosen empirically: it can be chosen for example randomly or the first node at the origin of the constitution of the cluster can be designated as the master node.

It is noted that the criteria retained to designate the master node and the weighted combination of these criteria where appropriate, are preferably re-assessed at different times, for example periodically, and the master node may be caused to be modified if another node of the cluster proves to have become more stable than the current master node.

In the embodiment described here, the nodes of the ad hoc network 1 are configured to implement a hybrid routing protocol based on a proactive routing protocol within their clusters and a reactive routing protocol outside their clusters, described briefly below.

To this end, each node of the ad hoc network 1 is configured to send regularly (periodically) to its neighbor nodes (i.e. with which it has an active connectivity link) in each cluster to which it belongs, control messages and more particularly announcement messages (designated here as "Hello") to report its presence to its neighbor nodes. Such announcement messages are conventionally used in the proactive routing protocols of the state of the art such as for example in the OLSR and OSPF (Open Shortest Path First) routing protocols. The broadcast and receipt of these messages "Hello" within the cluster allow each node N of the cluster to maintain up-to-date a routing table RT(N) listing the active routes to join each of the other nodes of its cluster.

An example of such a routing table RT is illustrated in FIG. 3, for the node N=A2B2 belonging to the cluster A and the cluster B. It is for example stored in the non-volatile memory 5 of the node A2B2.

In the embodiment described here, the routing table RT(N) of a node N comprises a plurality of lines, each line being associated with a "destination" node of the ad hoc network 1 (several lines can be associated with a same node), and a plurality of columns listing:

- the identifier of the destination node corresponding to the considered line (see reference ID in the routing table in FIG. 3),
- the nature (e.g. "box", "antenna", "PC", "tablet") or the degree of mobility of this destination node (e.g. fixed or mobile) (cf. reference "TYPE" in FIG. 3), knowing that as indicated above, the nature of the destination node provides an indication on its degree of mobility;
- the cluster(s) to which the destination node belongs (see reference "CLUSTERS" in FIG. 3), and
- the route allowing to reach this destination node from the node N (see reference "ROUTE" in FIG. 3): each route comprises one or more route segments, each route segment directly linking two nodes of the ad hoc network 1 (in other words representing a connectivity link between two nodes of the ad hoc network 1). It is presented in the example of the routing table RT(N) in the form of a list of pairs, each pair corresponding to a segment of the route with which characteristics of the connectivity link implemented on this segment are associated (Wifi, WifiDirect (WFD), LTE Direct (LTE) and Bluetooth Low Energy (BLE) in the example envisaged in FIG. 3). These characteristics identify in particular the type of connectivity link existing between the two nodes linked by the segment (i.e. here the nature of the connectivity interface used by the two nodes to communicate Peer-to-Peer with each other). As a variant, they may comprise other indications such as, for example, a propagation time observed on this segment, a theoretical throughput, a bandwidth, a lifetime in the ad hoc network 1, etc.

Thus, in the example of the routing table RT (N=A2B2) illustrated in FIG. 3, the node A2B2 is a direct neighbor of the node A1 that belongs to the cluster A and is a box, and has a "WiFI"-type connectivity link with this neighbor. Similarly, according to the routing table RT(A2B2), the node A2B2 can join the node A3 belonging to the cluster A and which is a personal computer (PC) in two hops via the node A1, the nodes A1 and A2B2 being in direct connection via a WiFI-type connectivity link, as well as the nodes A1 and A3, etc.

The routing table RT(N) maintained by a node N therefore contains different active routes within the ad hoc network 1 allowing the node N to join other nodes of this network.

It is noted that no limitation is attached to the form strictly speaking of the routing table RT(N) maintained by each node N of the ad hoc network 1. This routing table can take forms different from the one illustrated in FIG. 3. For example, instead of directly referencing the routes allowing the node N to join a node of the ad hoc network 1, it can contain only active route segments within the ad hoc network (and for each segment contain its origin node, its end node, and the characteristics of the connectivity link established between these two nodes (in particular its type)), then instructs the node N, via an appropriate algorithm, to identify the routes made up of one or more active segments listed in the routing table allowing it to reach a given node of the ad hoc network 1.

If a node belongs at the same time to several clusters, such as for example the node A2B2, it is configured to send messages "Hello" to all its neighbors of all the clusters to which it belongs (the clusters A and B in the example of the node A2B2).

These messages "Hello" are relayed Peer-to-Peer in the cluster so as to propagate in the cluster and thus reach all the nodes of the cluster.

In the embodiment described here, the messages "Hello" broadcast by the nodes within their cluster(s) comprise the following fields:

- a field "deviceId" containing an identifier of the node at the origin of the message "Hello";
- a field "clusterId" containing an identifier of the cluster to which the node at the origin of the message "Hello" belongs;
- a field "fromId" containing an identifier of the last node through which the message "Hello" has traveled, this field being updated each the message "Hello" is forwarded by a node of the cluster;
- a field "hopCount" indicating the number of hops already performed by the message "Hello" (i.e. nodes traversed in the cluster);
- a field "TTL" for "Time-to-Live" representing the number of hops remaining before stopping the propagation of the message "Hello" in the cluster;
- a field "deviceType" containing the type of the node at the origin of the message "Hello"; this field here reflects the nature (e.g. "box", "antenna", "PC", "tablet", "mobile") or the degree of mobility (fixed or mobile) of the node in question;
- a field "fromType" containing the type of the last node through which the message "Hello" has traveled; this field here reflects the nature (e.g. "box", "antenna", "PC", "tablet") or the degree of mobility (fixed or mobile) of the node in question, this field being updated each time the message "Hello" is forwarded by a node of the cluster;
- a field "linkType" containing the type of the connectivity link of the last route segment traversed, this field being updated each time the message "Hello" is forwarded by a node of the cluster. In the illustrative example envisaged here, the type of the connectivity link can be Wifi, WifiDirect (WFD), LTE Direct (LTE) or Bluetooth Low Energy (BLE).

The fields "deviceType", "fromType", "linkType" allow the nodes of the cluster to inform their routing tables with information representative of the nature or degree of mobility of the nodes of the cluster as well as the type of connectivity links established within the cluster.

The fields indicated above are given for illustrative purposes. As a variant, the message "Hello" can comprise other fields (more or less) than those indicated above and allowing the nodes to inform their routing tables in an adequate manner to implement the invention (for example the field "linkType" can be omitted if all the links within the same cluster use the same connectivity, etc.).

Thus, in the example of FIG. 1, for the cluster A and the node A6, the node A6 is configured to send a message "Hello" to its neighbor node A5 whose field content is reproduced below:

| deviceId | clusterId | fromId | hopCount | TTL | deviceType | fromType | linkType |
|---|---|---|---|---|---|---|---|
| A6 | A | A6 | 0 | 10 | Mobile | Mobile | Wifi |

In another embodiment, the message "Hello" can contain an additional field containing the characteristics of the route taken by the message from the node at the origin of the message up to the current node (for example the node A4 can receive a message "Hello" coming from the node A6 and having traveled through the nodes A5 and A1 containing in this field the route (Wifi, A6), (Wifi, A5), (Wifi, A1)).

When the node A5 receives the message "Hello" from the node A6, it first updates its routing table RT(A5) with the information contained in the message "Hello".

In the embodiment described here, each route listed in the routing table of a node is associated with a time attribute "Timestamp" which allows storing the time of receipt of a message affecting this route (not represented in FIG. 3). When a message "Hello" is received by a node, the latter determines whether this message contains a route or a route segment corresponding to the information conveyed by the message (in the example described here a route segment allowing it to reach the node A6). Where appropriate, it updates the time attribute associated with this route or route segment with the time of receipt of the message "Hello". Otherwise, it creates a new entry in the table listing the route or route segment indicated in the message "Hello" and associates it with the time of receipt of the message "Hello".

Then, as indicated in the table below, it inserts the value A5 in the field "fromId" of the message "Hello", decrements the field "TTL" by 1 and increments the field "hopCount" by 1. The node A5 then transfers the message "Hello" thus updated to its neighbors in the cluster A (i.e. the nodes A1 and A4 in the example considered).

| deviceId | clusterId | fromId | hopCount | TTL | deviceType | fromType | linkType |
|---|---|---|---|---|---|---|---|
| A6 | A | A5 | 1 | 9 | Mobile | Mobile | WiFi |

Analogously, the node A1 receives the message "Hello" coming from the node A5, and updates its routing table RT(A1) as indicated above. Then, as indicated in the table below, it inserts the value A1 in the field "fromId" of the message "Hello", decrements the field "TTL" by 1, increments the field "hopCount" by 1, and transmits the thus updated message towards its neighbors A3, A4 and A2B2 in the cluster A.

| deviceId | clusterId | fromId | hopCount | TTL | deviceType | fromType | linkType |
|---|---|---|---|---|---|---|---|
| A6 | A | A1 | 2 | 8 | Mobile | box | WiFi |

For its part, the node A4 receives the message "Hello" coming from the node A5 and coming from the node A1. It updates its routing table RT based on the received messages "Hello". But since it has already received these messages from its only two neighbors in the cluster A, it does not retransmit them.

Finally, the nodes A3 and A2B2 receive the message "Hello" coming from A1, update their respective routing tables based on the information contained in the message, but do not re-transfer it: indeed, the node A3 does not have other neighbors in the cluster A than the node A1 from which it received the message "Hello", and the node A2B2 has indeed another neighbor (the node B1) but it does not belong to the cluster A.

It should be noted that a mechanism intended to avoid the loop retransmission of the messages "Hello" within the cluster can be implemented; such a mechanism is known per se (already used in some proactive routing protocols) and is not described here. For example, it uses the field TTL of the message "Hello". This field can also be used to prevent the message "Hello" from being propagated too far in the ad hoc network 1 and to prevent too many messages "Hello" from flooding the ad hoc network 1.

Furthermore, it is possible in an alternative embodiment to use a proactive routing protocol different from the one that has just been described within each cluster to fill the routing tables of the nodes of each cluster, such as for example a proactive routing protocol known as DSDV, GSR, OLSR, etc. protocol.

As mentioned earlier, the nodes of the ad hoc network 1 are configured to use a reactive protocol to exchange information with the nodes that do not belong to their cluster.

More specifically here, to this end, each master node noted as MN of a cluster has a table of clusters CT(MN) listing the clusters it knows and the master nodes of these clusters. In addition, each master node MN of a cluster is configured to send regularly (periodically) control messages, which will be here referred to as messages "InfoCluster", to the master nodes of the clusters of which it knows the existence, in other words, listed in its table of clusters CT(MN), to share in particular with these master nodes the information it has on the clusters of which it knows the existence and in particular the master nodes of these clusters.

In the embodiment described here, the messages "InfoCluster" broadcast by the master nodes to the master nodes of the other clusters comprise the following fields:

a field "deviceId" containing an identifier of the master node at the origin of the message "InfoCluster";

a field "clusterId" containing an identifier of the cluster to which the master node at the origin of the message "InfoCluster" belongs;

a field "fromDeviceId" containing an identifier of the last master node through which the message "InfoCluster" has traveled, this field being updated each time the message "InfoCluster" is forwarded by a master node of a cluster;

a field "fromClusterId" containing an identifier of the cluster of the last master node through which the message "InfoCluster" has traveled, this field being updated each time the message "InfoCluster" is forwarded by a master node of a cluster;

a field "knownClusters" containing the list of pairs (cluster identifier, corresponding master node) known by the master node at the origin of the message "InfoCluster";

a field "TTL" for "Time-to-Live" representing the number of remaining hops (i.e. master nodes through which the message travels) before stopping the propagation of the message "InfoCluster".

The fields indicated above are given for illustrative purposes. As a variant, the message "InfoCluster" may comprise other fields (more or less) than those indicated above.

Thus, in the example illustrated in FIG. 1, if the master node C1D4 of the cluster C is considered, it knows the clusters B and D, and sends a message "InfoCluster" to the master node B1 and to the master node D1 whose message content is indicated in the table below:

| deviceId | clusterId | fromDeviceId | fromClusterId | knownClusters | TTL |
| --- | --- | --- | --- | --- | --- |
| C1D4 | C | C1D4 | C | (B, B1), (D, D1) | 3 |

When the master node B1 receives the message "InfoCluster" from the master node C1D4, it first updates its table of clusters CT(B1) with the information contained in the message. For example, it updates its table of clusters CT(B1) if the message "InfoCluster" it receives contains new clusters it did not know previously (for example here, with the cluster D and the master node D1 of the cluster D, if the master node B1 did not already know the cluster D) or if the master cluster nodes it knows have been modified compared to the master nodes identified in its table of clusters.

Then it modifies the fields "fromDeviceId", "fromClusterId" and TTL of the message "InfoCluster" as indicated in the table below and transfers the message to the other master cluster nodes it knows with the exception of the master node C1D4 which it received the message, namely here to the master nodes A1 and D1.

| deviceId | clusterId | fromDeviceId | fromClusterId | knownClusters | TTL |
| --- | --- | --- | --- | --- | --- |
| C1D4 | C | B1 | B | (B, B1), (D, D1) | 2 |

The master node D1 proceeds in the same way as the master node B1 based on the message "InfoCluster" received from the master node C1D4.

The master node A1 receives the message "InfoCluster" coming from the master node B1 and updates its table of clusters CT(A1) by proceeding in a manner similar to what has been described previously for B1. It now knows the existence of the clusters B, C and D, and of the master nodes designated for these clusters.

It is noted that, as with the messages "Hello", an anti-loop mechanism can be implemented, in particular thanks to the field TTL to stop the loop retransmission of a message "InfoCluster".

Moreover, in the embodiment described here, it was considered that each master node maintains up-to-date a table of clusters CT containing the clusters and the master nodes of the clusters it knows. In one alternative embodiment, not only the master nodes of the clusters maintain such a table, but also the other nodes of the cluster, this table containing the clusters known to the node.

Thanks to the table of clusters maintained by the master nodes, it is possible, as mentioned above, to implement a reactive routing protocol outside each cluster. It is assumed here that each node within a cluster knows the master node of its own cluster (for example via a table of clusters as described above, managed by the node).

When an origin node, for example the node A3 of the cluster A, wishes to send a message containing data to another node of the ad hoc network 1, for example to the node D2 belonging to the cluster D, the latter examines its routing table RT(A3) to determine whether it knows the destination node D2 and a route allowing to reach this node. If the node D2 is listed in its routing table (i.e. there is at least one line corresponding to ID=D2 in the table), the node A3 identifies the route allowing to reach the node D2 (in the example of the routing table illustrated in FIG. 3, it recovers the route(s) contained in the column "ROUTE" of its table and corresponding to a field "ID" equal to D2), and sends its data message to the next node indicated by the route. The case where several routes are determined is described in more detail later with reference to FIG. 4.

If, on the other hand, the node D2 is not listed in its routing table, in other words, the node A3 does not know a route to join the node D2, it sends a control message to the master node A1 of its cluster in accordance with a reactive routing protocol. This control message is here a route discovery request RREQ, comprising a plurality of fields, namely:

a field "sequenceNumber" containing a sequence number allowing to differentiate the requests RREQ during their passage through a common node;

a field "sourceDeviceId" containing an identifier of the node at the origin of the request RREQ;

a field "sourceClusterId" containing an identifier of the cluster of the node at the origin of the request RREQ;

a field "destDeviceId" containing an identifier of the destination node of the request RREQ (for example D2 in the example envisaged here of the route to join the node D2);

a field "destClusterId" containing an identifier of the cluster of the destination node of the request RREQ (for example D in the example envisaged here of the route to join the node D2);

a field "hops" containing the list of the nodes relaying the request RREQ as well as the characteristics of the connectivity links they maintain with the nodes directly preceding them in the list. These characteristics comprise in particular the type of the connectivity link, but can also include other characteristics of the link such as for example the theoretical throughput of this link, the propagation time on the link, the available bandwidth, etc.;

a field "hopsCount" indicating the number of hops already performed by the request RREQ (i.e. number of traversed intermediate nodes); and a field "TTL" for "Time-to-Live" representing the number of remaining hops (i.e. nodes) before the stopping the propagation of the request RREQ.

The fields indicated above are given for illustrative purposes. As a variant, the control message "RREQ" can comprise other fields (more or less) than those indicated above. It is however noted that the field "hops" described above is particularly advantageous within the framework of the invention since it conveys information on the characteristics of the connectivity links existing between the nodes (and in particular on the type of these connectivity links).

If the node A3 belongs to several clusters, it sends a request RREQ to all the master nodes of the clusters to which it belongs.

The master node A1 upon receipt of the request RREQ, examines its routing table to determine if it knows a route up to the node D2. If the node D2 is listed in its routing table (i.e. there is at least one line corresponding to ID=D2 in the table), the master node A1 identifies the route allowing to reach the node D2 and indicates it in response to the request RREQ emitted by the node A3 via a control message, in this case here a response message RREP. Otherwise, the master node A1 examines its table of clusters and then transmits the request RREQ to the master nodes of the clusters it knows (or as a variant of its neighbor clusters) after having updated the fields "hop", "hopsCount" and "TTL" of the request, in other words in the example envisaged here to the master node B1 of the cluster B, to the master node D1 of the cluster D and to the master node C1D4 of the cluster C via the routes indicated in its routing table to join these master nodes.

Upon receipt of the request RREQ coming from the master node A1, the master node B1 examines its routing table RT(B1) to determine if it knows the node D2. If D2 is listed in a line of its routing table RT(B1), it recovers the corresponding route(s) and returns it/them to the master node A1 via a control message, in this case a response message RREP.

If the master node B1 does not know a route to join the node D2 (D2 is not listed in its routing table), the master node B1 transmits the route discovery request RREQ to the master nodes of the clusters it knows with the exception of the master node A1 (obtained from its table of clusters), in this case here to the master nodes D1 and C1D4.

The master node D1, upon receipt of the request RREQ coming from the master node B1, examines its routing table RT(D1) to determine if it knows the node D2. As it is the case (D2 belongs to its cluster), it returns the route(s) allowing reaching D2 to the master node B1 in a response message RREP (control message within the meaning of the invention). It is assumed here that the response message RREP has the same format and contains the same fields described previously as the request RREQ.

It is noted that the master node D1 receives the request RREQ from two different master nodes, namely from the master node B1 and from the master node A1. This can advantageously allow it to discover several routes having different characteristics. The response message RREP is therefore also sent to the master node A1 which in turn relays it to the node A3.

The master node B1 forwards the response message to the master node A1, which in turn relays it to the node A3.

Furthermore, the master node C1D4 which also received the request RREQ, also knows a route to join the node D2 (since it belongs to the same cluster D here). The master node C1D4 therefore also sends back the corresponding route to the master node B1 in a response message RREP.

The master node B1 retransmits the response message to the master node A1 which in turn relays it towards the node A3.

In accordance with the invention, each master node through which a response message RREP travels extracts the routing information contained in this message and advantageously updates its routing table with this information before retransmitting the response message towards the next (master) node.

Upon receipt of the two response messages sent respectively by the master nodes D1 and C1D4, the node A3 updates its routing table RT(A3). More particularly, it adds two lines in its routing table RT(A3) (if each of the messages contains a single route, if not as many lines as there are routes contained in the response messages) in which it indicates the routes communicated by the master nodes C1 and C1D4 allowing to join the node D2. How the node A3 selects one of these routes is described in more detail later with reference to FIG. 4.

It is noted that it is possible in an alternative embodiment to use a reactive routing protocol different from the one that has just been described to discover routes outside each cluster and to fill the routing tables of the nodes of the ad hoc network, such as for example a reactive routing protocol known as DSR, AODV, etc. protocol.

According to the invention, the routing table RT(N) of a node N is updated, as described above, thanks to the control messages "Hello" exchanged within the framework of the proactive routing protocol implemented within each cluster to discover the active routes within this cluster, thanks to the requests RREQ and responses RREP to these requests exchanged within the framework of the reactive protocol outside the clusters, but also more generally based on information conveyed by each control message emitted within the ad hoc network 1 to allow the routing of data within it. These control messages include in particular all the control messages exchanged within the framework of the proactive and reactive routing protocols described above, that is to say, not only the messages aiming at announcing itself to its neighbor nodes (message "Hello"), the route discovery requests RREQ and the responses to these requests RREP, but also the error messages RRER reported by the nodes of the network when, for example, they detect that an intermediate node on a route has become unreachable or that a connectivity link has broken, etc.

In a known manner within an ad hoc network such as the ad hoc network 1, during an exchange of data between an origin node and a destination node via a route determined by the origin node thanks to its routing table, if one of the intermediate nodes of the route becomes unreachable (for example an intermediate node disconnects from the ad hoc network 1) and another node of the route detects the problem, it is configured to send towards the origin node an error message designated here by a message RERR. By way of illustration, it is assumed in the example of FIG. 1 that the node A3 exchanges data with the node C3 via the route consisting of the nodes A3-A1-A2B2-B1-B4C4-C1D4-C3, and that the node B4C4 leaves the ad hoc network 1 (for example it is disconnected). The route taken by the data exchanged between the nodes A3 and C3 becomes invalid. Thereby, when the node A3 emits a new data message to the node C3, when the data message arrives on the node B1, the link towards the node B4C4 is no longer available. The node B1 detects this problem and sends back an error message RERR towards the node A3 to report the problem.

In the embodiment described here, the error message RERR comprises a plurality of fields, namely:

a field "sourceDeviceId" containing an identifier of the node that has detected a problem affecting the connectivity of one of the nodes of ad hoc network 1 (node which has become unreachable) and therefore which is at the origin of the error message RERR;

a field "sourceClusterId" containing an identifier of the cluster of the node at the origin of the error message RERR;

a field "errorDeviceId" containing an identifier of the node that has become unreachable;

a field "errorClusterId" containing an identifier of the cluster of the node that has become unreachable;

a field "errorLink" containing the type of the connectivity link towards the node that has become unreachable which is no longer usable (to manage the cases where a node can be reachable via several connectivity interfaces and where only one of them is no longer usable);

a field "route" containing all the intermediate nodes belonging to the route that has become invalid as well as the characteristics of the connectivity links between these nodes (for example in the form of a series of pairs comprising the identifier of the nodes and the characteristics of the connectivity links as described previously for the routing table).

The fields indicated above are given for illustrative purposes. As a variant, the error message "RRER" can comprise other fields (more or less) than those indicated above. It is however noted that the field "errorLink" described above is particularly advantageous within the framework of the invention since it conveys information on the characteristics of the connectivity link towards the node that has become unreachable.

All the intermediate nodes traversed on the route between the nodes B1 and C3, namely in this example the nodes A2B2 and A1, relay the error message RERR emitted by the node B1 to report the non-availability of the node B4C4: in accordance with the invention, before relaying the error message towards the next node on the route, the traversed nodes extract from the error message the information reflecting the non-availability of the node B4C4 (contained in the fields errorDeviceId, errorClusterId, errorLink in particular, and take this opportunity to update their respective routing tables. This update here consists here in invalidating all the routes that travel through the node B4C4 in their routing tables, in other words in removing from their routing tables the routes passing through the node B4C4. In the variant where the routing tables only comprise route segments directly linking two nodes, this update consists in deleting from the routing tables the segments whose origin node or end node of the segment is the node that has become unreachable that is to say here the node B4C4.

In the embodiment described here, the nodes of the ad hoc network 1 also update their routing tables based on routing information conveyed by the data messages exchanged on the ad hoc network 1 and which are intended therefor or travel therethrough. It could be envisaged in another embodiment that when a master node of a cluster receives an error message type control message, it propagates it towards the nodes of its cluster so that they update their routing tables accordingly.

In the embodiment described here, the nodes of the ad hoc network 1 also update their routing tables from routing information conveyed by the data messages exchanged on the ad hoc network 1 and which are intended therefor or travel therethrough.

In a known manner, once a route has been determined in an ad hoc network between an origin node of a data message and a destination node, there are two strategies conventionally implemented to ensure that the data message take this route:

the data message contains, for example in a field of its header, the list of the identifiers of all the intermediate nodes of the route to be taken, as well as the characteristics of the connectivity links linking together these intermediate nodes (for example in the form of a list of pairs comprising the identifier of each intermediate node associated with the characteristics of the connectivity link to be used with this node). When an intermediate node receives the data message, it simply transfers it to the next node identified in the list via the connectivity link indicated; or the data message contains, for example in a field of its header, only the identifier of the next intermediate node through which it must pass. When an intermediate node receives the data message, it consults its routing table and determines the next node to send the message to.

The first strategy has the advantage of a reduced time for traversing the nodes, as it is not necessary for these nodes to consult their routing tables to relay the data message. The drawback, however, is that in case of a route that has become invalid (for example following the disconnection of an intermediate node), it is necessary to send an error message RERR to the node at the origin of the data message so that the latter chooses a new route for its data message and reports it by re-emitting its data message with the new chosen route. The first strategy has therefore a privileged interest when the nodes of the ad hoc network 1 are stable and when the connectivity links between the nodes are not caused to vary too often over time.

The second strategy allows, on the other hand, an intermediate node that detects a connectivity problem on the route to change it in real time, and therefore to adapt to the new topology of the ad hoc network. The time for traversing each intermediate node is however longer than according to the first strategy, because it must consult its routing table.

In the embodiment described here, it is assumed that the first strategy is implemented by the nodes of the ad hoc network 1 when sending data messages: each node at the origin of a data message selects a route in the ad hoc network 1 for this message, as indicated in more detail later and reports it in its entirety in the header of the data message. It is noted that the invention by recommending the choice of a route maximizing the stability of the intermediate nodes and of the connectivity links linking these nodes improves the efficiency of the first strategy.

As mentioned above, the nodes of the ad hoc network 1 also update here their respective routing tables based on the routing information conveyed by the data messages exchanged on the ad hoc network 1 and which are intended therefor or travel therethrough. Indeed, in the embodiment described here, each data message contains in its header, the list of the intermediate nodes of the route chosen by the node at the origin of the data message, as well as the type of connectivity link of each segment taken. The data message also contains information on the origin and/or destination node of the message. The intermediate nodes taken by the data message can therefore advantageously exploit this information to refresh their routing tables.

Typically, the intermediate nodes can use the routing information contained in the data messages traveling therethrough to discover the existence of new nodes within the network and the routes to reach these new nodes, thus extending their knowledge of the elements of the ad hoc network 1. But they can also update their routing tables with complementary information allowing to assess the stability of the routes and/or their activities (for example by storing in their routing tables complementary information characterizing the routes or the segments listed, as in particular a parameter corresponding to the last use of a route or by updating a lifetime parameter characterizing the time from which a route exists. The intermediate nodes can also delete from their routing tables the routes that have become invalid when they transfer an error message emitted in response to a data message.

It is noted that in the embodiment described here, each node N of the ad hoc network 1 maintains a single routing table RT(N) referencing all the nodes of the network it knows. As a variant, each node can manage several routing tables, for example a routing table for the nodes of its cluster and another routing table for the nodes external to its cluster.

Figure 4:
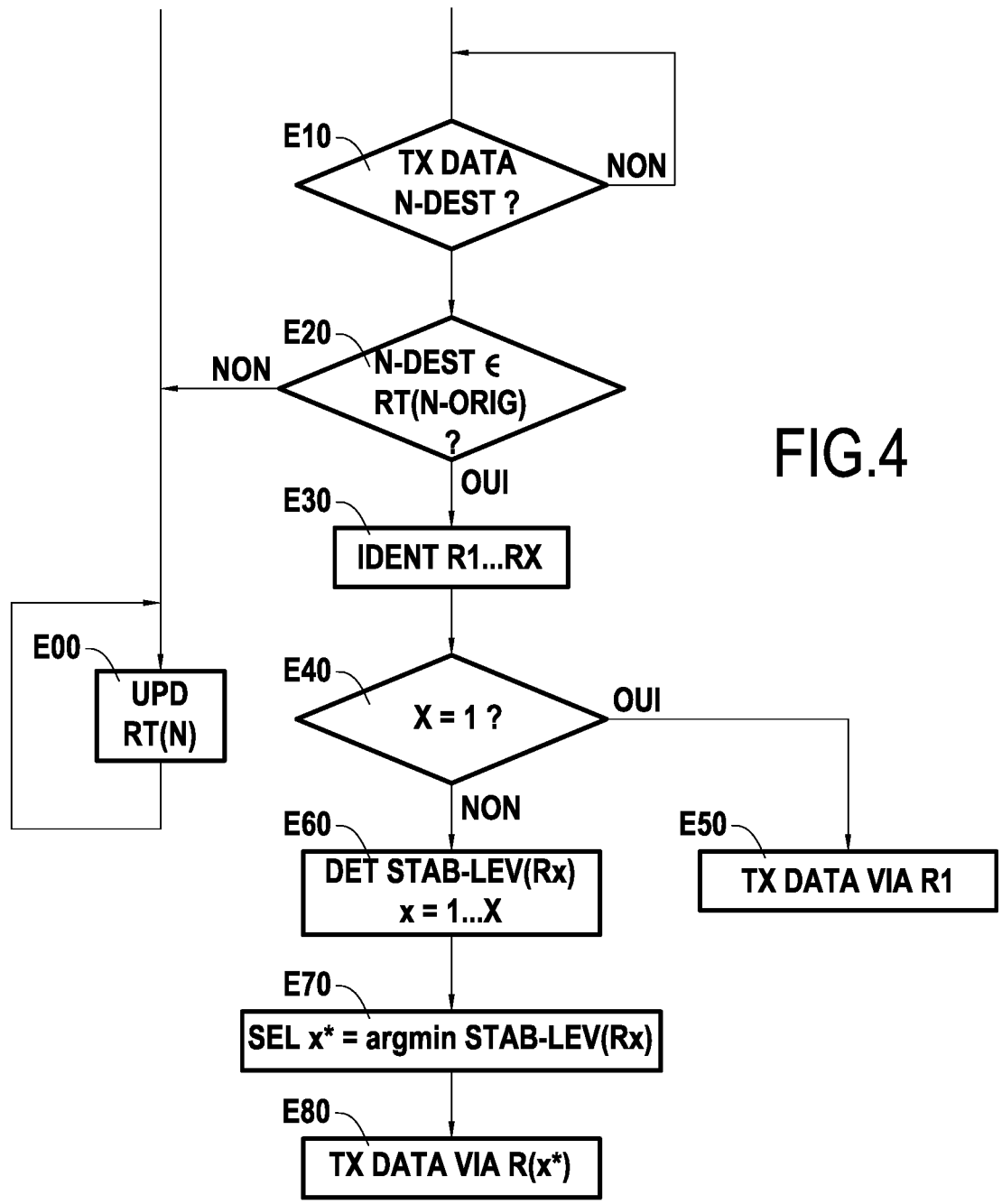
FIG. 4 represents, in flowchart form, the main steps of a selection method according to the invention as implemented by each node of the ad hoc communication network of FIG. 1.

It will now be described, with reference to FIG. 4, the main steps implemented by a node called origin node, referenced by N-ORIG, to select a route in the ad hoc network 1 when it wishes to exchange data with a node called destination node, referenced by N-DEST, belonging to the ad hoc network 1. These steps are the steps of a selection method according to the invention as they are implemented by the modules for maintaining up-to-date 7, identifying 8, determining 9 and selecting 10 the origin node N-ORIG in accordance with the invention.

It is therefore assumed here that a node of the ad hoc network 1 N-ORIG, for example the node N-ORIG=A2B2, wishes to send a data message to a destination node N-DEST of the ad hoc network 1, for example to the node N-DEST=D1 (step E10). To this end, it consults, through its identification module 8, its routing table RT(N-ORIG), an example of which for the node A2B2 is illustrated in FIG. 3 (test step E20), in order to determine if it contains one or more routes allowing it to join the destination node N-DEST.

As mentioned previously, the nodes of the ad hoc network 1, and in particular the node N-ORIG, are configured to maintain up-to-date their respective routing tables based on the information reported in the control messages and in the data messages traveling therethrough or intended therefor. They can at any time, if these do not contain the routes required to reach a destination node with which they wish to exchange data, complete them by sending a route discovery message (request RREQ) as described above. These various updates constitute a step of maintaining up-to-date within the meaning of the invention (step E00), implemented by the up-to-date maintenance module 7 of each node of the ad hoc network 1. It is understood that the updates of the routing table of a node are therefore not necessarily correlated with the sending of a data message thereby, but they can be carried out asynchronously according to the control and data messages circulating within the ad hoc network 1 and traveling through the node in question; an update of the routing table of a node can however be triggered in connection with the sending of a data message by this node to a destination node if the node does not contain, in its routing table, an identified route allowing it to reach the destination node (response no to the test step E20).

In the example of the routing table RT(N-ORIG=A2B2) of the node N-ORIG=A2B2 given in FIG. 3, there are two available (i.e. active) routes identified in the table that allow joining the destination node D1 (response yes to step E20):

a first route R1 passes through the nodes B1 and B3D3, before arriving to the destination node D1;

a second route R2 passes through the nodes B1, B4C4, C1D4 and D2 before arriving to the destination node D1.

The consultation of its routing table RT(N-ORIG) therefore allows the origin node N-ORIG, and more particularly its identification module 8, to identify X routes R1, ..., RX available to reach the destination node N-DEST (X designating an integer greater than or equal to 1), with X=2 in the example of FIG. 3, the two routes identified being the aforementioned routes R1 and R2 (step E30).

If only one route R1 is identified (X=1, response yes to the test step E40), the node N-ORIG indicates here, in the header of the data message it wishes to send to the destination node N-DEST, the thus identified route R1, and sends its data message via this route to the destination node N-DEST (step E50), in a manner known per se and not described in detail here. The data message is relayed by the intermediate nodes of the route as mentioned previously, up to the destination node N-DEST. Each intermediate node updates, where appropriate, its routing table based on the routing information indicated by the origin node N-ORIG in the header of the data message.

If several available routes R1, ..., RX have been identified by the identification module 8 in the routing table RT(N-ORIG=A2B2) (i.e. X>1, response no to the test step E40), in accordance with the invention, the node N-ORIG, via its determination module 9 and its selection module 10, selects the most stable route available within the ad hoc network 1.

For this purpose, the determination module 9 of the node N-ORIG determines, for each available route Rx, x=1, ..., X identified in the routing table, a level of stability of the route noted STAB-LEV(Rx) reflecting here the level of stability of the nodes of this route and of the connectivity links linking together these nodes (step E60).

In the embodiment described here, in order to determine the level of stability STAB-LEV(Rx), it has been previously assigned to each type of possible connectivity link, a stability score called local stability score. This local stability score is, in the example envisaged here, all the more low than the connectivity link is considered as stable. This convention is of course in no way limiting and the inverse convention can be used.

More particularly, in the embodiment described here, the local stability score assigned to a wired-type connectivity link is lower than the local stability score assigned to a wireless-type connectivity link: the local stability score of a wired-type connectivity link, within the meaning of the adopted convention, is therefore better than the local stability score of a wireless-type connectivity link. It is for example considered, by way of illustration, the assignment of the following local stability scores to the different connectivity links likely to be used in the ad hoc network 1:

wired-type connectivity links:
local score of 1 for an optical link,
local score of 2 for an Ethernet link,
local score of 3 for an xDSL (Digital Subscriber Line) link, etc.;

wireless-type connectivity links:
local score of 10 for a link using a mobile network (type 2G, 3G, 4G, etc.),
local score of 11 for an LTE Direct link,
local score of 20 for a WiFi link,
local score of 21 for a WiFi Direct link,
local score of 30 for a Bluetooth link, etc.

Of course, this example is given for illustrative purposes only. It is noted that the local stability score may also depend on a theoretical throughput associated with the connectivity link and reachable on this link. For this purpose, it is possible to define different throughput slices, for example, a slice DR1 ranging from 0 to 1 Mbits/s, a slice DR2 ranging from 1 to 30 Mbit/s, a slice DR3 ranging from 30 to 100 Mbit/s and a slice DR4 for the throughputs greater than 100 Mbit/s and associate a local score to each of these slices (for example, the higher the throughput on a link, the lower the associated score), which is added to the local stability score associated with the different types of aforementioned connectivity links to characterize the score of a connectivity link.

Similarly, a local stability score is associated based on the degree of mobility of each node of the ad hoc network 1. For this purpose, a local stability score can be associated in a binary way depending on whether the node is considered as mobile or fixed, but a greater granularity can be obtained by assigning, within each category (corresponding to a "fixed"-type degree of mobility or to a "mobile"-type degree of mobility), local stability scores based on the type of node considered (e.g. depending on whether it is a portable phone, a box, a base station associated with an antenna of a mobile network, etc.). It is considered here that the fixed nodes are more stable than the mobile nodes, and therefore a lower local stability score (i.e. better with regard to the adopted convention) is assigned to a fixed node compared to a mobile node. For example, for illustrative purposes:

for the fixed nodes, a local score comprised between 1 and 3 is assigned according to the following distribution:
  a local score of 1 is assigned to a base station associated with a radio antenna of a mobile network,
  a local score of 2 is assigned to a box of an operator,
  a local score of 3 is assigned to a terminal such as a desktop or laptop computer or a connected object such as an IoT (Internet of Things) object;
  for the mobile nodes, a local score of 10 is assigned whatever the nature of the node considered (smartphone, digital tablet, etc.).

Of course, this example is given for illustrative purposes only.

Based on the local stability scores assigned to the different types of links and to the different possible degrees of mobility of the nodes of the ad hoc network 1, the determination module 9 calculates an overall stability score for each available route Rx, x=1, . . . , X identified by the identification module 8. This overall stability score reflects the level of stability STAB-LEV(Rx) of each route Rx. It is calculated here by summing the local stability scores assigned to the connectivity links of the segments of the route based on their type and to the nodes of this route based on their degree of mobility. Thus, in the example envisaged here of the two routes R1 and R2:

$$STAB\text{-}LEV(R1) = \underbrace{21+10}_{segment\ (A2B2,B1)} + \underbrace{21+10}_{segment\ (B1,B3\ D3)} + \underbrace{30+3}_{segment\ (B3D3,D1)}$$

namely STAB-LEV(R1)=95, and $$STAB\text{-}LEV(R2) = \underbrace{21+10}_{segment\ (A2B2,B1)} + \underbrace{21+10}_{segment\ (B1,B4\ C4)} + \underbrace{11+1}_{segment\ (B4C4,C1\ D4)} +$$
$$\underbrace{21+10}_{segment\ (C1\ D4,D2)} + \underbrace{30+3}_{segment\ (D2,D1)}$$

namely STAB-LEV(R2)=138.

As a variant, a weighted sum of the local scores assigned to the links and nodes can be envisaged with different weights of the unit (for example to distinguish the importance of the stability of the links from those of the nodes, etc.).

Once these two levels of stability have been calculated, the selection module 10 of the node N-ORIG selects the route among the routes R1 and R2 presenting the best stability (i.e. the best level of stability), in other words with the convention considered here, the one that corresponds to the lowest level of stability calculated (step E70). It is therefore here the route R1 that is selected by the selection module 10 to send the data message to the destination node N-DEST=D1.

The node N-ORIG indicates this route in its data message and emits it via its means of communication on the ad hoc network 1 to the node D1, in a conventional manner known per se (step E80).

In the embodiment described here, the selection of the route is made so as to maximize its stability and more particularly the stability of its segments and its nodes. In another embodiment, besides the stability of the route, the selection module 10 also takes into account other factors to select the route on which to send the data intended for the node N-DEST; it can in particular take into account the type of data that the node N-ORIG wishes to send to the node N-DEST and the real time constraints that this type of data imposes. These factors can be taken into account for example upon calculation of the level of stability by assigning to each route a score of ability to convey this type of data (intended to be added to the overall stability score calculated for the route). This additional ability score can be set based for example on:

the expected latency on the route relative to a minimum latency to be guaranteed for the data;
  the throughput offered by the route;
  the propagation time on the route relative to a maximum propagation time set for the data (important constraint for the real-time applications);
  the presence on the route of a certain type of connectivity (for example, it may be wished to favor a stable route that does not use a Bluetooth connectivity).

These criteria are assessed for example based on the characteristics of the connectivity links stored in the routing table of each node. In any case, the aforementioned constraints are taken into account in addition to the stability of the route, in other words, in accordance with the invention, the most stable route is favored, taking into account or not additional constraints.

The invention claimed is:

1. A method implemented by a first node of an ad hoc network, said method comprising:
  maintaining a routing table containing at least one route available within the ad hoc network, said at least one route comprising at least one route segment directly linking together two nodes of the ad hoc network by a connectivity link, at least one type of which is identified in the routing table, said routing table further comprising, for at least one linked node different from said first node, an indication concerning a degree of mobility of said linked node, the routing table being maintained up-to-date based on information extracted from control messages emitted over the ad hoc network intended for the first node and from control messages emitted over the network traveling through the first node;
  upon sending a data message from the first node to a second node of the ad hoc network:

identifying, by using the routing table, at least one route available between the first node and the second node to send the data message; and in response to several available routes being identified:
determining levels of stability of said identified available routes based on the indications concerning the degree of mobility of the nodes of said routes and on the type of connectivity links of the segments of the routes contained in the routing table; and selecting one of the identified available routes based on said determined levels of stability.

2. The method according to claim 1 further comprising:
assigning a stability score called local stability score to at least one type of connectivity link and to at least one type of degree of mobility likely to be contained in the routing table; and calculating a stability score called overall stability score for at least one identified available route reflecting the level of stability of this route, this overall stability score being calculated from a weighted sum of the local stability scores assigned to the connectivity links of the segments of this route based on their type and to the nodes of this route based on the indications concerning their degree of mobility, contained in the table.

3. The method according to claim 2, wherein, during the assigning:
the local stability score assigned to a wired-type connectivity link is better than the local stability score assigned to a wireless-type connectivity link; and/or
the local stability score assigned to a fixed-type degree of mobility is better than the local stability score assigned to a mobile-type degree of mobility.

4. The method according to claim 2 wherein the local stability score assigned to a type of connectivity link depends on a connectivity interface used on this link and/or on a theoretical throughput achievable on this type of link.

5. The method according to claim 1, wherein during selecting, the route is selected by also taking into account:
a type of data transported by the message; and/or
a constraint in terms of propagation time, latency and/or throughput between the first node and the second node; and/or
an absence or a presence of at least one type of connectivity link for the route segments.

6. The method according to claim 1, wherein the control messages from which the routing table is maintained up-to-date are control messages of a reactive routing protocol comprising announcement messages, route discovery messages, response messages to the discovery messages and error messages reporting an unavailability of a node or link of the ad hoc network.

7. The method according to claim 1, wherein during the maintaining, the routing table is also maintained up-to-date based on routing information extracted from data messages emitted over the ad hoc network intended for the first node and/or from data messages emitted over the network traveling through the first node.

8. The method according to claim 1, wherein:
the ad hoc network is organized in clusters;
the routing table also comprises, for said at least one node different from the first node belonging to said route segment, an identifier of at least one cluster of the ad hoc network to which this node belongs;
the first node uses a reactive routing protocol to emit route discovery messages to nodes that do not belong to a cluster to which it belongs.

9. A non-transitory computer-readable recording medium on which a computer program is recorded including instructions which when executed by a processor of a first node configure the first node to select a route in an ad hoc network by:
maintaining a routing table containing at least one route available within the ad hoc network, said at least one route comprising at least one route segment directly linking together two nodes of the ad hoc network by a connectivity link, at least one type of which is identified in the routing table, said routing table further comprising, for at least one linked node different from said first node, an indication concerning a degree of mobility of said linked node, the routing table being maintained up-to-date based on information extracted from control messages emitted over the ad hoc network intended for the first node and from control messages emitted over the network traveling through the first node;
upon sending a data message from the first node to a second node of the ad hoc network:
identifying, by using the routing table, at least one route available between the first node and the second node to send the data message; and
in response to several available routes being identified:
determining levels of stability of said identified available routes based on the indications concerning the degree of mobility of the nodes of said routes and on the type of connectivity links of the segments of the routes contained in the routing table; and
selecting one of the identified available routes based on said determined levels of stability.

10. A node of an ad hoc network, called a "first node", comprising:
a processor; and
a non-transitory computer-readable recording medium on which a computer program is recorded including instructions which when executed by the processor configure the first node to:
maintain a routing table containing at least one route available within the ad hoc network, said route comprising at least one route segment directly linking together two nodes of the ad hoc network by a connectivity link, at least one type of which is identified in the routing table, said routing table further comprising, for at least one linked node different from said first node belonging to a said route segment, an indication concerning a degree of mobility of said linked node, the routing table being maintained up-to-date based on information extracted from control messages emitted over the ad hoc network intended for the first node and from control messages emitted over the network traveling through the first node;
upon sending a data message from the first node to a second node of the ad hoc network:
identify at least one available route between the first node and the second node by using the routing table;
in response to several routes available between the first node and the second node being identified:
determine said identified available routes, levels of stability based on the indications concerning the degree of mobility of the nodes of said routes and on the type of connectivity links of the segments of said routes contained in the routing table, and select one of the identified available routes based on said determined levels of stability.

11. An ad hoc communication network comprising a plurality of nodes according to claim 10.

12. The ad hoc communication network according to claim 11, wherein the nodes are organized into a plurality of clusters, said nodes being configured to implement a proactive routing protocol within the clusters to which the nodes respectively belong and a reactive routing protocol outside these clusters, each cluster comprising a node called master node designated for the cluster able to emit control messages according to the reactive routing protocol to the master nodes of the other clusters, the master node designated for a cluster corresponding to the node among the nodes of the cluster which is the most stable in terms of connectivity and/or activity within the ad hoc network.

13. The first node of an ad hoc network according to claim 10, wherein the instructions which when executed by the processor further configure the first node to:
 assign a stability score called local stability score to at least one type of connectivity link and to at least one type of degree of mobility likely to be contained in the routing table; and
 calculate a stability score called overall stability score for at least one identified available route reflecting the level of stability of this route, this overall stability score being calculated from a weighted sum of the local stability scores assigned to the connectivity links of the segments of this route based on their type and to the nodes of this route based on the indications concerning their degree of mobility, contained in the table.

14. The first node of an ad hoc network according to claim 10, wherein the instructions which when executed by the processor further configure the first node to select the route by also taking into account:
 a type of data transported by the message; and/or
 a constraint in terms of propagation time, latency and/or throughput between the first node and the second node; and/or
 an absence or a presence of at least one type of connectivity link for the route segments.

15. The node of an ad hoc network according to claim 10 wherein the control messages from which the routing table is maintained up-to-date are control messages of a reactive routing protocol comprising announcement messages, route discovery messages, response messages to the discovery messages and error messages reporting an unavailability of a node or link of the ad hoc network.

16. The node of an ad hoc network according to claim 10 wherein:
 the ad hoc network is organized in clusters;
 the routing table also comprises, for said at least one node different from the first node belonging to said route segment, an identifier of at least one cluster of the ad hoc network to which this node belongs;
 the first node uses a reactive routing protocol to emit route discovery messages to nodes that do not belong to a cluster to which it belongs.

17. The non-transitory computer-readable recording medium according to claim 9 wherein during selecting, the route is selected by also taking into account:
 a type of data transported by the message; and/or
 a constraint in terms of propagation time, latency and/or throughput between the first node and the second node; and/or
 an absence or a presence of at least one type of connectivity link for the route segments.

18. The non-transitory computer-readable recording medium according to claim 9 wherein the control messages from which the routing table is maintained up-to-date are control messages of a reactive routing protocol comprising announcement messages, route discovery messages, response messages to the discovery messages and error messages reporting an unavailability of a node or link of the ad hoc network.

19. The non-transitory computer-readable recording medium of claim 9 wherein during the maintaining, the routing table is also maintained up-to-date based on routing information extracted from data messages emitted over the ad hoc network intended for the first node and/or from data messages emitted over the network traveling through the first node.

20. The non-transitory computer-readable recording medium of claim 9 wherein:
 the ad hoc network is organized in clusters;
 the routing table also comprises, for said at least one node different from the first node belonging to said route segment, an identifier of at least one cluster of the ad hoc network to which this node belongs;
 the first node uses a reactive routing protocol to emit route discovery messages to nodes that do not belong to a cluster to which it belongs.

* * * * *